United States Patent [19]

McCollum et al.

[11] Patent Number: 5,114,552
[45] Date of Patent: May 19, 1992

[54] COMPOSITIONS COMPRISING IONIC RESINS AND CAPPED POLYISOCYANATE MIXTURES CONTAINING A DIPHENYL-2,4'-DIISOCYANATE AND A DIPHENYL-4,4'-DIISOCYANATE

[75] Inventors: Gregory J. McCollum, Glenshaw; George W. Mauer, Allison Park, both of Pa.

[73] Assignee: PPG Industries, Inc., Pittsburgh, Pa.

[21] Appl. No.: 833,872

[22] Filed: Feb. 25, 1986

Related U.S. Application Data

[63] Continuation-in-part of Ser. No. 698,993, Feb. 7, 1985, Pat. No. 4,615,779.

[51] Int. Cl.$^5$ ............................................. C25D 13/06
[52] U.S. Cl. ................................. 204/181.7; 524/901; 523/404; 523/410; 523/415
[58] Field of Search ................... 204/181.7; 523/415, 523/404, 410; 524/901

[56] References Cited

U.S. PATENT DOCUMENTS

| | | | |
|---|---|---|---|
| 4,296,010 | 10/1981 | Tominaga | 204/181.7 |
| 4,344,798 | 8/1982 | Gaul et al. | 524/729 X |
| 4,405,752 | 9/1983 | Recker et al. | 524/847 |
| 4,439,593 | 3/1984 | Kelso et al. | 528/45 |
| 4,518,522 | 5/1985 | Markusch et al. | 528/45 X |
| 4,546,039 | 10/1985 | Horacek et al. | 428/357 |
| 4,576,989 | 3/1986 | Noll et al. | 524/591 |
| 4,590,245 | 5/1986 | Daimer et al. | 204/181.7 X |
| 4,615,779 | 10/1986 | McCollum et al. | 204/181.7 |
| 4,656,199 | 4/1987 | Niederdellmann et al. | 524/724 X |
| 4,677,180 | 6/1987 | Schmitt et al. | 528/45 |

FOREIGN PATENT DOCUMENTS

| | | |
|---|---|---|
| 31650 | 7/1981 | European Pat. Off. . |
| 192113 | 8/1986 | European Pat. Off. . |

*Primary Examiner*—John F. Niebling
*Assistant Examiner*—John S. Starsiak, Jr.
*Attorney, Agent, or Firm*—William J. Uhl

[57] ABSTRACT

Curable electrocoating compositions and the use of these compositions in a method of electrodeposition are disclosed. The electrocoating compositions comprise an aqueous dispersion of an active hydrogen-containing ionic resin and a capped polyisocyanate in which the polyisocyanate comprises a mixture of a diphenyl-2,4'-diisocyanate, a diphenyl-4,4'-diisocyanate and optionally polyphenyl polyisocyanate in which the diphenyl-2,4'-diisocyanate comprises at least 5 percent by weight of a polyisocyanate mixture. The capped polyisocyanate mixture results in a more stable aqueous dispersion than comparable dispersions prepared with capped polyisocyanates derived from the more common diphenyl-4,4'-diisocyanate and mixtures of diphenyl-4,4'-diisocyanate with polyphenyl polyisocyanate.

24 Claims, No Drawings

COMPOSITIONS COMPRISING IONIC RESINS AND CAPPED POLYISOCYANATE MIXTURES CONTAINING A DIPHENYL-2,4'-DIISOCYANATE AND A DIPHENYL-4,4'-DIISOCYANATE

CROSS-REFERENCE TO RELATED APPLICATION

This application is a continuation-in-part of application Ser. No. 698,993, filed Feb. 7, 1985, now U.S. Pat. No. 4,615,779.

BACKGROUND OF THE INVENTION

1. Field of the Invention

The present invention relates to electrodeposition compositions and, more particularly, to aqueous dispersions of electrodeposition compositions containing capped polyisocyanate curing agents.

2. Brief Description of the Prior Art

Electrodeposition compositions, particularly cationic electrodeposition compositions containing capped polyisocyanate curing agents, are known in the art. The cationic compositions, particularly those derived from cationic epoxy-amine reaction products, provide for outstanding corrosion resistance over steel substrates and have been used extensively as primers for automobile and truck bodies. A particularly desirable polyisocyanate for use in these compositions is diphenylmethane-4,4'-diisocyanate, commonly called MDI, and a mixture of diphenylmethane-4,4'-diisocyanate and polymethylene polyphenyl isocyanate, commonly referred to as crude MDI. Such polyisocyanates are relatively non-volatile at curing temperatures compared to other aromatic polyisocyanates such as toluene diisocyanate, and this lack of volatility is a distinct advantage in primer applications where the volatile polyisocyanates can discolor and impede the cure of the subsequently applied top coats. This problem is discussed in U.S. Pat. No. 4,296,010.

A disadvantage associated with MDI and crude MDI is that these polyisocyanates often result in unstable electrodeposition compositions. The compositions are in the form of aqueous dispersions and it has been found that the resinous phase often sediments from the dispersion. The problem is particularly acute when the polyisocyanate is capped with a low molecular weight capping agent such as methanol or ethanol. The sediment cannot easily be redispersed and results in an electrodeposition bath which cannot be serviced adequately and which does not provide for satisfactory electrodeposited coatings.

Surprisingly, it has been found that particular mixtures of a diphenyl-2,4'-diisocyanate and a diphenyl-4,4'-diisocyanate provide for capped isocyanates which, when formulated into aqueously dispersed electrocoating compositions, provide for stable dispersions and satisfactory electrodeposited coatings.

SUMMARY OF THE INVENTION

In accordance with the present invention, there is provided a curable composition comprising a mixture of an active hydrogen-containing ionic resin and a capped polyisocyanate dispersed in aqueous medium. The polyisocyanate comprises a mixture of a diphenyl-2,4'-diisocyanate, a diphenyl-4,4'-diisocyanate and optionally polyphenyl polyisocyanate in which the diphenyl-2,4'-diisocyanate comprises at least 5 percent by weight of the polyisocyanate mixture.

The invention also provides for a method of electrodeposition employing the curable compositions described above.

DETAILED DESCRIPTION

The compositions of the present invention contain as essential ingredients an ionic resin and a capped polyisocyanate.

The ionic resins for use in electrodeposition are well known in the art and include both anionic resins and cationic resins with the cationic resins being preferred because of the superior corrosion resistance attainable with such resins. The ionic resins should contain active hydrogens, such as hydroxyl, primary amino, secondary amino and thiol, including mixtures thereof. The active hydrogens are reactive with the capped polyisocyanates resulting in a curing reaction when the coatings are heated. Examples of cationic resins are those which contain amine salt groups such as the acid-solubilized reaction products of polyepoxides and primary or secondary amines as described in U.S. Pat. No. 4,031,050 to Jerabek and U.S. Pat. No. 3,922,253 to Jerabek et al.

Besides amine salt group-containing resins, quaternary ammonium salt group-containing resins can also be employed. Examples of these resins are those which are formed from reacting an organic polyepoxide with a tertiary amine acid salt. Such resins are described in U.S. Pat. No. 4,101,486 to Bosso et al. Examples of other cationic resins are ternary sulfonium salt group-containing resins such as those described in U.S. Pat. No. 4,038,232 to Bosso et al.

Specially modified cationic resins such as those containing primary amine groups formed from reacting the polyepoxides with diketimines containing at least one secondary amine group, for example, the methyl isobutyl diketimine of diethylenetriamine, can also be used and in fact their use is preferred. Such resins are described in U.S. Pat. No. 4,017,438 to Jerabek et al.

Modified resins such as those obtained by chain extending the polyepoxide to increase its molecular weight are also preferred in the practice of the invention. Such materials are described in U.S. Pat. No. 4,148,772 to Jerabek et al in which the polyepoxide is chain extended with a polyester polyol and in U.S. Pat. No. 4,468,307 to Wismer et al in which the polyepoxide is chain extended with a particular polyether polyol. Also, chain extension such as disclosed in Canadian Patent 1,179,443 can be used.

The epoxy polymers which are used in preparing the cationic resins are polyepoxides, that is, polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A.

Besides the polyglycidyl ethers of polyphenols, epoxy-containing polymers which can be used are acrylic polymers which contain epoxy groups. These polymers are formed by polymerizing an unsaturated epoxy group-containing monomer such as glycidyl acrylate or glycidyl methacrylate with one or more polymerizable ethylenically unsaturated monomers. Examples of these polymers are described in U.S. Pat. No. 4,001,156, column 3, line 59, to column 5, line 60, the portions of which are hereby incorporated by reference.

Examples of amines which can be used in preparing the polyepoxide-amine reaction products are ammonia, primary, secondary and tertiary amines and mixtures thereof. The reaction product of the polyepoxides and the amines is at least partially neutralized with an acid to form a polymeric product containing amine salt and/or a quaternary ammonium salt group. Reaction conditions of polyepoxides with amines, examples of various amines and at least partial neutralization with acid are disclosed in U.S. Pat. No. 4,260,720, column 5, line 20, to column 7, line 4, the portions of which are hereby incorporated by reference.

With regard to the amount of organic amine and polyepoxide which are reacted with one another, the relative amounts depend on the extent of cationic base such as cationic salt group formation desired and this in turn will depend upon the molecular weight of the polymer. The extent of cationic salt group formation and the molecular weight of the reaction product should be selected such that when the resultant cationic polymer is mixed with aqueous medium, a stable dispersion will form. A stable dispersion is one which does not settle or is one which is easily dispersible if such sedimentation occurs. In some embodiments, the dispersion should additionally be of sufficient cationic character that the dispersed polymer particles will migrate towards the cathode when an electrical potential is impressed between an anode and a cathode immersed in the aqueous dispersion.

Also, the molecular weight, structure and extent of cationic salt group formation should be controlled such that the dispersed polymer will have the required flow to form a film on the substrate. In the case of electrodeposition, to form a film on the cathode. The film should be insensitive to moisture to the extent that it will not redissolve in the electrodeposition bath or be rinsed away from the coated surface after removal from the bath. In general, the cationic polymers useful in the practice of the invention will have average molecular weights (Mw) as determined by gel permeation chromatography using a polystyrene standard of less than 100,000, more preferably less than 75,000, and most preferably less than 50,000. The minimum molecular weight is about 500.

The cationic polymers usually will contain from 0.01 to 10, preferably from about 0.1 to 5.0, more preferably from about 0.3 to 3.0, milliequivalents of basic group, for example, cationic group, per gram of resin solids. Obviously, one must use the skill of the art to couple the molecular weight with the cationic group content to arrive at a satisfactory product. The polyglycidyl ethers will have molecular weights of about 500 to 10,000, preferably 1000 to 5000. Acrylic polymers, on the other hand, will have molecular weights a high as 100,000, preferably 5000 to 50,000.

The active hydrogens associated with the cationic resins of the invention can be selected from any of the active hydrogens which are reactive with isocyanates over the temperature range of 200°–400° F. (93°–204° C.), preferably 250°–350° F. (121°–177° C.). Typically, the active hydrogens will be those associated with hydroxyl, primary and secondary amino and thiol, including mixed groups such as hydroxyl and primary amino.

Besides cationic resins, the ionic resin can be an anionic resin. Such resins suitable for use in electrodeposition are described in U.S. Pat. Nos. 3,366,563; 3,369,983; 3,403,088; 3,530,054; 3,565,781 and 3,772,227.

The capped organic polyisocyanate which is used in the invention is one which is compatible with the ionic resin to form a curable electrodeposition composition and when dispersed in aqueous medium, forms a stable dispersion suitable for use in electrodeposition. By stable it is meant that the aqueous dispersion at a resin solids content of about 5 to 50 percent by weight will not sediment for at least one week upon standing at 20°–25° C.

The organic polyisocyanate is a mixture of a diphenyl-2,4'-diisocyanate, a diphenyl-4,4'-diisocyanate and optionally polyphenyl polyisocyanate in which the diphenyl-2,4'-diisocyanate comprises at least 5 percent, preferably at least 10 percent by weight of the mixture. The preferred polyisocyanate mixtures comprise from about 10 to 75 percent by weight of the 2,4'-isomer; 15 to 55 percent by weight of the 4,4'-isomer and 0 to 75, typically 10 to 50 percent by weight of the polyphenyl polyisocyanate; the percentages by weight being based on total weight of the polyisocyanate mixture. It should be mentioned that the polyisocyanate mixture typically has a small amount, that is, less than 10 percent by weight of the 2,2'-isomer.

The diphenyl diisocyanates of the mixture contain two phenyl groups having two isocyanate groups directly bonded to nuclear carbon atoms in the 2,4' position and the 4,4' position. The phenyl groups may be bonded directly to one another such as in the structure:

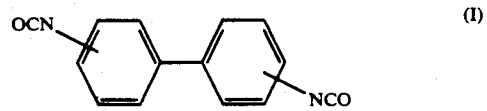

(I)

or bonded to one another through an intermediate linkage such as alkylene, substituted alkylene, ether, carbonyl and sulfo such as in the structure:

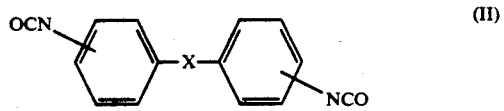

(II)

where X is alkylene, substituted alkylene, ether, carbonyl and sulfo. Preferably, X is alkylene or substituted alkylene such as in the structure:

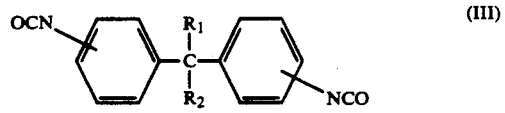

(III)

where $R_1$ and $R_2$ can be the same or different and represent hydrogen, which is preferred, and lower alkyl containing from 1 to 4 carbon atoms such as methyl and ethyl.

As mentioned above, the isocyanate groups are substituted in the 2,4' position and the 4,4' position. The other positions on the phenyl rings may be substituted with lower alkyl groups containing 1 to 4 carbon atoms such as methyl and lower alkoxy groups such as methoxy. Usually, the other positions are unsubstituted.

The preferred diisocyanates of the mixture are diphenylmethane-2,4'-diisocyanate and diphenylmethane-4,4'-diisocyanate because of their low cost, ready availability and good performance.

The polyphenyl polyisocyanate can be represented by the structures:

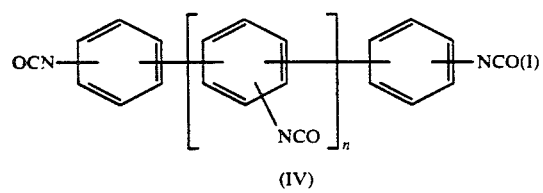

(IV)

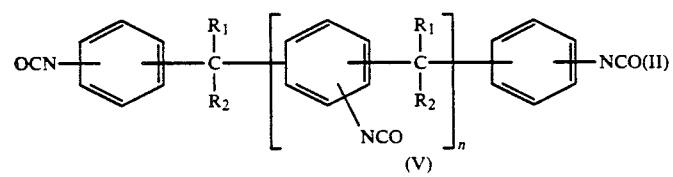

(V)

where n is an integer of 1 to 4, $R_1$ and $R_2$ can be the same or different and represent hydrogen or lower alkyl containing 1 to 4 carbon atoms such as methyl. Usually, the polyphenyl polyisocyanate is of structure V above and is polymethylene polyphenylisocyanate.

The capping agent is an active hydrogen-containing material which readily reacts with the isocyanate groups to form capped isocyanate groups. These groups, although relatively stable at ambient temperatures, uncap at elevated temperature to bring about reaction with the active hydrogens associated with the ionic resin to form a cured coating. Examples of suitable capping agents include alcohols such as those which have an average molecular weight of 76 or less and would include methanol, ethanol and propanol and mixtures thereof. Such capping agents are preferred because they result in low volatile weight loss on curing and in the formation of smoother films. Capping agents having an average molecular weight greater than 76 can be used but the particular advantages of the invention are most evident with capping agents having an average molecular weight of 76 or less. Examples of other capping agents would be higher molecular weight alcohols such as monoalkylethers of ethylene glycol such as 2-ethoxyethanol, 2-butoxyethanol; alicyclic alcohols such as cyclohexyl alcohol and aryl aliphatic alcohols such as benzyl alcohol. Oximes such as methyl ethyl ketoxime and lactams such as epsilon-caprolactam can also be used.

The capped polyisocyanate can be used in two similar ways. The polyisocyanate can be fully blocked, that is, no free isocyanate groups remain, and then combined with the ionic polymer to form a two-component resin. Alternately, the polyisocyanate can be partially capped so that there are remaining reactive isocyanate groups. The partially capped polyisocyanate can then be reacted with the active hydrogens in the polymer backbone under conditions which will not uncap the blocked isocyanate groups. This reaction makes the isocyanate part of the polymer molecule and a one-component resin. Also, mixtures of fully capped and integral capped isocyanate can be used.

Whether present as a separate component or integral with the active hydrogen-containing ionic resin, the capped polyisocyanate is present in an amount sufficient to impart complete cure to the composition. Typically, the capped polyisocyanate is present with an isocyanate:active hydrogen equivalent ratio of 0.05 to 1.5:1, preferably 0.1 to 1.3:1. The active hydrogens are those associated with the ionic resin and other non-volatile active hydrogen-containing materials which may be present in the composition, for example, as modifying materials.

The ionic resin and the capped polyisocyanate curing agent are used for electrodeposition in the form of an aqueous dispersion. The term "dispersion" is believed to be a two-phase transparent, translucent or opaque resinous system in which the organic resin is the dispersed phase and the water is the continuous phase. The average particle diameter of the resinous phase is less than 10 and preferably less than 5 microns. The concentration of the resinous phase (ionic resin and capped polyisocyanate curing agent and any other optional organic materials) in the aqueous medium is usually at least 0.5, usually from 0.5 to 50 percent by weight based on total weight of the aqueous dispersion. For use as an electrodeposition bath, concentrations of 5 to 30 percent by weight are typical.

Besides water, other solvents such as organic solvents may be present in the composition. These solvents usually assist in coalescing when the composition is applied to a substrate to form a film. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxypentanone, ethylene and propylene glycol, the monoethyl, monobutyl and monohexyl ethers of ethylene glycol and methyl isobutyl ketone. The amount of coalescing solvent is not unduly critical and is generally between about 0.01 and 40 percent, preferably about 0.05 to about 25 percent by weight based on total weight of the aqueous medium.

Usually, a pigment composition and various additives such as surfactants or wetting agents are optionally included in the dispersion. The pigment compositions may be of the conventional types comprising, for example, iron oxide, lead oxide, strontium chromate, carbon black, titanium dioxide, talc, barium sulfate, as well as color pigments such as cadmium yellow, cadmium red, chromium yellow and the like. The pigment content of the dispersion is usually expressed as the pigment-to-resin ratio. In the practice of the invention, the pigment-to-resin ratio is usually within the range of 0.02 to 1:1. The other additives mentioned above are usually in the dispersion in amounts of about 0.01 to 10 percent by weight based on total weight of resin solids.

A cure catalyst is usually employed in the compositions and examples include organotin compounds such as dibutyltin dilaurate and dibutyltin oxide. The catalyst is usually present in amounts of about 0.1 to 5 percent by weight based on total weight of resin solids.

For use in electrodeposition, the aqueous dispersions are placed in contact with an electrically conductive anode and an electrically conductive cathode in which the surface to be coated being determined by the charge on the ionic resin. Following contact with the aqueous dispersion, an adherent film of the coating composition is deposited on one of the electrodes and a sufficient voltage is impressed between the electrodes. The conditions under which the electrodeposition is carried out are, in general, similar to those used in electrodeposition of other types of coatings. The applied voltage may be varied and can be, for example, as low as 1 volt to as high as several thousand volts, but is typically between 5 and 500 volts. The current density is usually between about 0.5 ampere and 15 amperes per square foot and tends to decrease during electrodeposition indicating the formation of an insulating film.

The coating composition of the present invention can be applied to a variety of electroconductive substrates especially metal such as steel, aluminum, copper, magnesium and the like, but also including metallized plastic and conductive carbon-coated materials.

After the coating has been applied by electrocoating, it is cured usually by baking at elevated temperatures. The compositions of the present invention, after being electrodeposited, have been found to cure completely at temperatures over the range of about 275°-375° F. (135°-191° C.), preferably 300°-350° F. (149°-177° C.) in about 20 to 45 minutes. Evidence of cure is seen by the solvent resistance of the cured coating, specifically its resistance to acetone. Cured coatings prepared with compositions done by the method of the invention can withstand 100 acetone double rubs without rubbing through the coating to the substrate. An acetone double rub is a rub back and forth across the same area of the coating with an acetone-saturated cloth using normal hand pressure.

Besides electrodeposition, the composition can be applied by other techniques such as spraying, dipping and roll coating. In these applications, they can be applied to both electroconductive and non-electroconductive substrates such as plastics, wood and ceramics. Curing can be at the times and temperatures mentioned above.

Illustrating the invention are the following examples which, however, are not to be considered as limiting the invention to their details. All parts and percentages in the examples as well as throughout the specification are by weight unless otherwise indicated.

EXAMPLES

The following examples show the preparation of curable electrocoating compositions comprising an active hydrogen-containing cationic resin and various capped polyisocyanate crosslinking agents. Certain of the compositions were cathodically electrodeposited.

EXAMPLE 1

A cationic electrodeposition resin was prepared from the following mixture of ingredients:

| Ingredients | Parts by Weight (grams) |
| --- | --- |
| EPON 828[1] | 597 |
| Bisphenol A-ethylene oxide adduct (1/6 molar ratio) | 213.5 |
| Bisphenol A | 173 |
| Methyl isobutyl ketone | 51.8 |
| Benzyldimethylamine (catalyst) | 0.84 |
| Benzyldimethylamine | 2.19 |
| Crosslinker[2] | 1037 |
| Diketimine[3] | 65.4 |
| N-methylethanolamine | 57.4 |

[1]Epoxy resin solution made from reacting epichlorohydrin and bisphenol A having an epoxy equivalent of about 188, commercially available from Shell Chemical Company.
[2]The capped polyisocyanate crosslinker was prepared from the following mixture of ingredients:

| Ingredients | Parts by Weight (grams) |
| --- | --- |
| Polyisocyanate[a] | 1330 |
| Methanol | 320 |
| Methyl isobutyl ketone | 707 |
| Dibutyltin dilaurate | 1.65 |

[a]Mixture of about 12 percent by weight diphenyl-methane-2,4'-diisocyanate; about 35 percent by weight diphenylmethane-4,4'-diisocyanate and about 53 percent by weight polymethylene polyphenyl isocyanate; the percentage by weight being based on total weight of polyisocyanate. The polyisocyanate was obtained from Mobay Chemical Company as MONDUR MRS.
The polyisocyanate, methyl isobutyl ketone and dibutyltin dilaurate were charged to a reaction flask and heated under a nitrogen atmosphere to 40° C. The methanol was added slowly while holding the temperature between 50° and 60° C. The temperature was held at 60° C. until no isocyanate was detectable by Infra Red analysis (IR). In the event IR indicated the presence of unreacted NCO, small amounts of 2-butoxyethanol were added to remove it.
[3]Diketimine derived from diethylene triamine and methyl isobutyl ketone (73 percent solids in methyl isobutyl ketone).

The EPON 828, bisphenol A-ethylene oxide adduct, bisphenol A and methyl isobutyl ketone were charged to a reaction vessel and heated under a nitrogen atmosphere to 140° C. The first portion of the benzyldimethylamine was added and the reaction mixture allowed to exotherm to about 185° C. and refluxed under reduced pressure to remove azeotropically any water present. The reaction mixture was cooled to 160° C., held for ½ hour, cooled further to 145° C. and the second portion of benzyldimethylamine added. The reaction mixture was held at 145° C. until a reduced Gardner-Holdt viscosity (50 percent resin solids in 2-methoxypropanol) of P-Q was obtained. The reaction mixture was cooled to 135° C. followed by the addition of the diketimine and N-methylethanolamine. The reaction mixture was cooled to 118° C. and held for 1½ hours followed by the addition of the crosslinker.

The resinous reaction mixture (1700 grams) was then dispersed in aqueous medium by adding it to a mixture of 43.3 parts of 88 percent aqueous lactic acid, 21.9 grams of a surfactant (described below) and 2190 grams of deionized water.

The surfactant was a cationic surfactant prepared by blending 120 parts of alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol, 221 parts by weight of deionized water and 19 parts by weight of glacial acetic acid.

The dispersion was further thinned with 875 grams of deionized water and vacuum stripped to remove organic solvent to give a dispersion having a solids content of 37.6 percent. The crosslinker comprised about 40 percent by weight of the resin solids. The dispersion was stable with no sedimentation and remained stable for 3 weeks upon standing at 21° C. with no indication of sedimentation.

EXAMPLE 2

A dispersed cationic electrodeposition resin similar to that of Example 1 was prepared with the exception that 2-butoxyethanol was used as the capping agent for the polyisocyanate. The capped polyisocyanate was prepared as generally described in Example 1 from the following mixture of ingredients:

| Ingredients | Parts by Weight (grams) |
| --- | --- |
| Polyisocyanate as used in Example 1 | 798 |
| 2-Butoxyethanol | 708 |
| Methyl isobutyl ketone | 643.8 |
| Dibutyltin dilaurate | 2.51 |

The aqueous dispersion of the cationic resin was prepared as generally described in Example 1. After vacuum stripping, the dispersion had a solids content of 36.7 percent. The dispersion was stable with no sedimentation and remained stable for 2 weeks upon standing at 21° C. with no indication of sedimentation.

COMPARATIVE EXAMPLE 3

A dispersed cationic resin similar to that of Example 1 was prepared with the exception that the capped polyisocyanate was based on a polyisocyanate mixture containing small amounts of diphenylmethane-2,4'-diisocyanate. The capped polyisocyanate was prepared as generally described in Example 1 from the following ingredients:

| Ingredients | Parts by Weight (grams) |
| --- | --- |
| Polyisocyanate[1] | 1330 |
| Methanol | 320 |
| Methyl isobutyl ketone | 707 |
| Dibutyltin dilaurate | 1.65 |

[1]Mixture of about 3 percent by weight diphenylmethane-2,4'-diisocyanate; about 51 percent by weight diphenylmethane-4,4'-diisocyanate and about 46 percent by weight polymethylene polyphenyl isocyanate; the percentage by weight being based on total weight of polyisocyanate. The polyisocyanate was obtained from Mobay Chemical Co. as MONDUR MR. The procedure for preparing the crosslinker was as generally described in Example 1.

The aqueous dispersion of the cationic resin was prepared as generally described in Example 1. After vacuum stripping, the dispersion had a solids content of 37.1 percent. The dispersion was not stable in that immediately after vacuum stripping the resin began to sediment from the dispersion resulting quickly in a layer of sludge forming at the bottom of the container.

COMPARATIVE EXAMPLE 4

A dispersed cationic resin similar to Example 2 was prepared with the exception that the capped polyisocyanate was based on a polyisocyanate in Comparative Example 3. The capped polyisocyanate was prepared as generally described in Example 1 from the following ingredients:

| Ingredients | Parts by Weight (grams) |
| --- | --- |
| Polyisocyanate as used in Comparative Example 3 | 798 |
| 2-Butoxyethanol | 708 |
| Methyl isobutyl ketone | 643.8 |
| Dibutyltin dilaurate | 2.51 |

The aqueous dispersion of the cationic resin was prepared as generally described in Example 1. After vacuum stripping, the dispersion had a solids content of 36.3 percent. The dispersion was not stable in that a few days after stripping, the resin began to sediment from the dispersion resulting quickly in a layer of sludge forming on the bottom of the container.

COMPARATIVE EXAMPLE 5

A dispersed cationic resin similar to that of Example 1 was prepared with the exception that the capped polyisocyanate was a mixed methanol-ethanol capped diphenylmethane-4,4'-diisocyanate and the capped polyisocyanate was present in the dispersion at about 30 percent by weight based on weight of resin solids.

The cationic resin was prepared as generally described in Example 1 from the following ingredients:

| Ingredients | Parts by Weight (grams) |
| --- | --- |
| EPON 828 | 597 |
| Bisphenol A-ethylene oxide adduct (1/6 molar ratio) | 213.5 |
| Bisphenol A | 173 |
| Methyl isobutyl ketone | 51.8 |
| Benzyldimethylamine | 0.84 |
| Benzyldimethylamine | 2.19 |
| Crosslinker | 667 |
| Diketimine | 67 |
| N-methylethanolamine | 57.4 |

The crosslinker was prepared from the following ingredients:

| Ingredients | Parts by Weight (grams) |
| --- | --- |
| Diphenylmethane-4,4'-diisocyanate[1] | 500.0 |
| Methanol | 49.7 |
| Ethanol | 107.5 |
| Methyl isobutyl ketone | 281.0 |
| Dibutyltin dilaurate | 0.66 |

[1]MONDUR M available from Mobay Chemical Co.

The polyisocyanate, methyl isobutyl ketone and dibutyltin dilaurate were charged to a reaction vessel and heated under a nitrogen atmosphere to 40° C. The methanol and ethanol were blended together and added slowly to the reaction mixture while holding at 60° C. The reaction mixture solidified with 35 ml of the methanol/ethanol blend left to be added. The reaction mixture was melted at about 100° C. and the remainder of the methanol and ethanol added. The reaction mixture was held between 115°–122° C. until no isocyanate was detectable by IR.

The aqueous dispersion of the cationic resin was prepared as generally described in Example 1. The dispersion was not stable in that prior to vacuum stripping, the resin began to sediment from the dispersion. After stripping, the dispersion was completely flocculated.

EXAMPLE 6

A dispersed cationic resin similar to that of Comparative Example 5 was prepared with the exception that the polyisocyanate was a mixture of about 55 percent by weight diphenylmethane-2,4'-diisocyanate and about 45 percent by weight diphenylmethane-4,4'-diisocyanate. The capped polyisocyanate was prepared as generally described in Comparative Example 5 from the following mixture of ingredients:

| Ingredients | Parts by Weight (grams) |
|---|---|
| Polyisocyanate[1] | 500 |
| Methanol | 49.7 |
| Ethanol | 107.5 |
| Methyl isobutyl ketone | 281.0 |
| Dibutyltin dilaurate | 0.66 |

[1]Mixture of about 55 percent by weight diphenylmethane-2,4'-diisocyanate and about 45 percent by weight diphenylmethane-4,4'-diisocyanate; the percentage by weight being based on total weight of polyisocyanate.

The polyisocyanate, methyl isobutyl ketone and dibutyltin dilaurate were charged to a reaction vessel and heated under a nitrogen atmosphere to 40° C. The methanol and ethanol were blended together and added to the reaction mixture at a temperature to keep the reaction mixture fluid. After all the methanol/ethanol blend was added, the reaction mixture was held at 90° C. until no isocyanate was detectable by IR.

The aqueous dispersion of the cationic resin was prepared as generally described in Example 1. After vacuum stripping, the dispersion had a solids content of 34.9 percent. The dispersion was stable with no sedimentation and remained stable for 2 weeks upon standing at 21° C. with no indication of sedimentation.

An untreated steel panel was cathodically electrodeposited in the dispersion at 24° C., at a voltage of 180 volts for 2 minutes to give a continuous coating having a thickness of 1.2 mils. The coating was cured at 170° C. for 30 minutes to give a hard, solvent-resistant coating.

A summary of the results of Examples 1-6 is presented in Table I below.

TABLE I

Condition of Aqueous Dispersions of Examples 1-6

| Example No. | Polyisocyanate | Capping Agent | Condition of Aqueous Dispersion |
|---|---|---|---|
| 1 | 12% diphenylmethane-2,4'-diisocyanate<br>35% diphenylmethane-4,4'-diisocyanate<br>53% polymethylene polyphenyl isocyanate | methanol | stable |
| 2 | same as Example 1 | 2-butoxyethanol | stable |
| 3 | 3% diphenylmethane-2,4'-diisocyanate<br>51% diphenylmethane-4,4'-diisocyanate<br>46% polymethylene polyphenyl isocyanate | methanol | unstable |
| 4 | same as Example 3 | 2-butoxyethanol | unstable |
| 5 | diphenylmethane-4,4'-diisocyanate | methanol/ethanol | unstable |
| 6 | 55% diphenylmethane-2,4'-diisocyanate<br>45% diphenylmethane-4,4'-diisocyanate | methanol/ethanol | stable |

We claim:

1. An aqueous dispersion composition comprising a mixture of an active hydrogen-containing ionic resin derived from at least one epoxy functional reactant and a capped polyisocyanate dispersed in aqueous medium for which the capping agent is a low molecular weight alcohol having an average molecular weight no greater than 76, and in which the polyisocyanate comprises a mixture of a diphenyl-2,4'-diisocyanate and a diphenyl-4,4'-diisocyanate in which the diphenyl-2,4'-diisocyanate comprises at least 5 percent by weight of the polyisocyanate mixture, such that said aqueous dispersion composition is physically stable for at least about two weeks at a temperature of at least about 21° C.

2. The composition of claim 1 in which the active hydrogen-containing ionic resin is a cationic resin.

3. The composition of claim 1 in which the diphenyl-2,4'-diisocyanate and the diphenyl-4,4'-diisocyanate are diphenylalkane diisocyanates.

4. The composition of claim 3 in which the diphenylalkane-2,4'-diisocyanate and the diphenylalkane-4,4'-diisocyanate are diphenylmethane -2,4'-diisocyanate and diphenylmethane-4,4'-diisocyanate.

5. The composition of claim 1 which contains polymethylene polyphenyl polyisocyanate.

6. The composition of claim 1 in which the capped polyisocyanate is a fully capped polyisocyanate.

7. The composition of claim 1 in which the capping agent is selected from the class consisting of methanol, ethanol and propanol.

8. The composition of claim 1 in which the equivalent ratio of isocyanate to active hydrogen is from 0.05 to 1.5:1.

9. The composition of claim 1 in which the ionic resin and capped polyisocyanate are dispersed in aqueous medium and are present in amounts of 0.5 to 50 percent by weight based on total weight of the aqueous dispersion.

10. The composition of claim 2 in which the cationic resin is an at least partially acid-neutralized polyepoxide-amine reaction product.

11. The composition of claim 1 in which the diphenyl-2,4'-diisocyanate comprises at least 10 percent by weight of the polyisocyanate mixture.

12. A method of electrocoating an electrically conductive surface serving as an electrode in an electrical circuit comprising said electrode and a counter-electrode of opposite polarity immersed in an aqueous dispersion of an electrocoating composition, comprising passing electric current between the electrodes to cause a coating to deposit on said electrode, wherein the curable electrocoating composition comprises an active hydrogen-containing ionic resin derived from at least one epoxy functional reactant and a capped polyisocyanate for which the capping agent is a low molecular weight alcohol having an average molecular weight no greater than 76, in which the polyisocyanate comprises a mixture of a diphenyl-2,4'-diisocyanate and a diphenyl-4,4'-diisocyanate in which the diphenyl-2,4'-diisocyanate comprises at least 5 percent by weight of the polyisocyanate mixture, such that said aqueous dispersion composition is physically stable for at least about two weeks at a temperature of at least about 21° C.

13. The method of claim 12 in which the electrically conductive surface serving as said electrode is a cathode and the active hydrogen-containing ionic resin is a cationic resin.

14. The method of claim 12 in which the diphenyl-2,4'-diisocyanate and the diphenyl-4,4'-diisocyanate are diphenylalkane diisocyanates.

15. The method of claim 14 in which the diphenylalkane-2,4'-diisocyanate and the diphenylalkane-4,4'-diisocyanate are diphenylmethane-2,4'-diisocyanate and diphenylmethane-4,4'-diisocyanate.

16. The method of claim 12 which contains polymethylene polyphenyl polyisocyanate.

17. The method of claim 12 in which the capped polyisocyanate is a fully capped polyisocyanate.

18. The method of claim 12 in which the capping agent is selected from the class consisting of methanol, ethanol and propanol.

19. The method of claim 12 in which the equivalent ratio of isocyanate to active hydrogen is from 0.05 to 1.5:1.

20. The method of claim 12 in which the cationic resin and capped polyisocyanate are dispersed in aqueous medium and are present in amounts of 0.5 to 50 percent by weight based on total weight of the aqueous dispersion.

21. The method of claim 13 in which the cationic resin is an at least partially acid-neutralized polyepoxide-amine reaction product.

22. The method of claim 12 in which the diphenyl-2,4'-diisocyanate comprises at least 10 percent by weight of the polyisocyanate mixture.

23. A curable electrocoating composition comprising an active hydrogen-containing cationic resin and a capped polyisocyanate dispersed in aqueous medium in which the polyisocyanate comprise a mixture of diphenylmethane-2,4'-diisocyanate, diphenylmethane-4,4'-diisocyanate and polymethylene polyphenyl isocyanate in which the diphenylmethane-2,4'-diisocyanate comprises at least 10 percent by weight of the polyisocyanate mixture and the capping agent is a low molecular weight alcohol having an average molecular weight no greater than 76.

24. A method of electrocoating an electrically conductive surface serving as a cathode in an electrical circuit comprising said cathode and an anode immersed in an aqueous dispersion of a curable electrocoating composition, comprising passing electric current between the cathode an the anode to cause a coating to deposit on the cathode, wherein the curable electrocoating composition comprises an active hydrogen-containing cationic resin and a capped polyisocyanate in which the polyisocyanate comprises a mixture of diphenylmethane-2,4'-diisocyanate, diphenylmethane-4,4'-diisocyanate and polymethylene polyphenyl isocyanate in which the diphenylmethane-2,4'-diisocyanate comprises at least 10 percent by weight of the polyisocyanate mixture and the capping agent is a low molecular weight alcohol having an average molecular weight no greater than 76.

* * * * *

UNITED STATES PATENT AND TRADEMARK OFFICE
CERTIFICATE OF CORRECTION

PATENT NO. : 5,114,552

DATED : May 19, 1992

INVENTOR(S) : Gregory J. McCollum et al

It is certified that error appears in the above-identified patent and that said Letters Patent is hereby corrected as shown below:

Col. 12, line 8, after "which" insert --additionally--.

Col. 13, line 8, after "which" insert --additionally--.

Col. 14, line 1, change "A" to --An aqueous dispersion of a--.

Col. 14, line 2, after "resin" insert --derived from at least one epoxy functional reactant--.

Col. 14, line 4, change "comprise" to --comprises--.

Col. 14, line 9, after "mixture" insert --, such that said aqueous dispersion composition is physically stable for at least about two weeks at a temperature of at least about 21°C,--.

Col. 14, line 17, change "an" to --and--.

Col. 14, line 20, after "resin" insert --derived from at least one epoxy functional reactant--.

Col. 14, line 26, after "mixture" insert --, such that said aqueous dispersion composition is physically stable for at least two weeks at a temperature of at least 21°C,--.

Signed and Sealed this

Fourteenth Day of September, 1993

*Attest:*

BRUCE LEHMAN

*Attesting Officer*  Commissioner of Patents and Trademarks